(12) United States Patent
Lin

(10) Patent No.: US 10,736,459 B2
(45) Date of Patent: Aug. 11, 2020

(54) MILK FOAM GENERATOR OF COFFEE MAKER

(71) Applicant: Nuo Feng Lin, Foshan (CN)

(72) Inventor: Nuo Feng Lin, Foshan (CN)

(73) Assignee: Nuo Feng Lin, Foshan (CN)

( * ) Notice: Subject to any disclaimer, the term of this patent is extended or adjusted under 35 U.S.C. 154(b) by 339 days.

(21) Appl. No.: 15/888,441

(22) Filed: Feb. 5, 2018

(65) Prior Publication Data

US 2019/0069714 A1 Mar. 7, 2019

(30) Foreign Application Priority Data

Sep. 6, 2017 (CN) .................... 2017 2 1135230 U

(51) Int. Cl.
*A47J 31/44* (2006.01)

(52) U.S. Cl.
CPC ....... *A47J 31/4489* (2013.01); *A47J 31/4403* (2013.01)

(58) Field of Classification Search
CPC .. A47J 31/4485; A47J 31/4489; A47J 31/128; A47J 31/4496
USPC ........................................................ 252/122
See application file for complete search history.

(56) References Cited

U.S. PATENT DOCUMENTS

| | | | | |
|---|---|---|---|---|
| 1,579,600 A | * | 4/1926 | Durante | F02M 7/18 138/46 |
| 1,619,937 A | * | 3/1927 | Huff | F16K 29/00 251/122 |
| 1,720,389 A | * | 7/1929 | Binks | B05B 7/1209 251/122 |
| 1,824,716 A | * | 9/1931 | Gibbons | F16K 1/52 137/886 |
| 1,988,819 A | * | 1/1935 | Stuart | F16K 1/52 251/122 |
| 2,007,051 A | * | 7/1935 | Hirvonen | F16K 1/54 251/122 |
| 2,014,314 A | * | 9/1935 | Defenbaugh | E21B 34/02 251/122 |
| 2,930,573 A | * | 3/1960 | Skellern | F16K 47/00 251/122 |
| 3,187,775 A | * | 6/1965 | Pinnell | F16K 1/52 137/625.3 |
| 3,221,767 A | * | 12/1965 | McCarty et al. | B60K 15/06 137/577 |

(Continued)

FOREIGN PATENT DOCUMENTS

| | | | | |
|---|---|---|---|---|
| CN | 201920509 U | * | 8/2011 | .......... A47J 31/4489 |
| WO | WO-2011104587 A1 | * | 9/2011 | .......... A47J 31/4485 |

*Primary Examiner* — Jason L Vaughan
(74) *Attorney, Agent, or Firm* — Luoh J. Wu; Continent Patent Office LLP

(57) ABSTRACT

The utility model discloses a milk foam generator of a coffee maker, comprising a milk tank, wherein the top part of the milk tank is provided with a support, a foam generator body is placed on the support, the foam generator body is respectively connected to an inlet milk pipe, a steam pipe and a milk foam sprayer, the foam generator body is internally provided with a first emulsification chamber, the first emulsification chamber is communicated with an air inlet channel, and the air inlet channel is internally provided with an air inlet adjustment member. The utility model has a simple structure, and is convenient for adjusting the emulsification effect of the milk foams.

4 Claims, 5 Drawing Sheets

(56) References Cited

U.S. PATENT DOCUMENTS

| | | | | |
|---|---|---|---|---|
| 3,365,166 A | * | 1/1968 | Smith | F16K 1/305 251/121 |
| 3,521,852 A | * | 7/1970 | Gillis, Jr. | F16K 47/04 251/121 |
| 3,636,978 A | * | 1/1972 | Byers | F15B 11/02 137/625.26 |
| 4,269,387 A | * | 5/1981 | Reynolds | F16K 27/0254 251/122 |
| 4,335,729 A | * | 6/1982 | Reynolds | A61M 5/16877 600/487 |
| 5,189,949 A | * | 3/1993 | Apa | A47J 31/4485 99/323.3 |
| 5,330,266 A | * | 7/1994 | Stubaus | A47J 31/4485 261/DIG. 76 |
| 5,473,972 A | * | 12/1995 | Rizzuto | A47J 31/4403 99/290 |
| 5,768,981 A | * | 6/1998 | Cicchetti | A47J 31/46 99/453 |
| 6,183,800 B1 | * | 2/2001 | van Straten | A47J 31/4485 137/889 |
| 6,192,785 B1 | * | 2/2001 | Trida | A47J 31/41 99/275 |
| 6,253,667 B1 | * | 7/2001 | Lussi | A47J 31/4485 261/142 |
| 6,763,849 B2 | * | 7/2004 | Sugiura | F16K 25/00 137/375 |
| 7,021,206 B2 | * | 4/2006 | Eckenhausen | A47J 31/461 99/452 |
| 7,252,034 B1 | * | 8/2007 | Eckenhausen | A47J 31/4485 99/293 |
| 7,946,219 B2 | * | 5/2011 | Marconi | A47J 31/60 99/323.1 |
| 8,336,448 B2 | * | 12/2012 | Buttiker | A47J 31/4485 222/132 |
| 8,657,262 B2 | * | 2/2014 | Burri | A47J 31/4485 261/26 |
| 8,661,968 B2 | * | 3/2014 | Turi | A47J 31/4485 426/231 |
| 8,991,430 B2 | * | 3/2015 | Huang | A61M 16/208 137/535 |
| 9,596,957 B2 | * | 3/2017 | Tonelli | A47J 31/58 |
| 10,448,782 B2 | * | 10/2019 | Andreis | A47J 31/4489 |
| 10,455,968 B1 | * | 10/2019 | Singer | A47J 31/401 |
| 2003/0232115 A1 | * | 12/2003 | Eckenhausen | A47J 31/4485 426/477 |
| 2007/0040136 A1 | * | 2/2007 | Caprera | F16K 1/482 251/122 |
| 2010/0212508 A1 | * | 8/2010 | Buttiker | A47J 31/4485 99/290 |
| 2011/0014329 A1 | * | 1/2011 | Turi | A47J 31/4485 426/231 |
| 2011/0070349 A1 | * | 3/2011 | Burri | A47J 31/4485 426/474 |
| 2011/0114091 A1 | * | 5/2011 | Lee | A61M 16/0816 128/203.12 |
| 2012/0118164 A1 | * | 5/2012 | Tonelli | A47J 31/4485 99/280 |
| 2012/0234186 A1 | * | 9/2012 | Krug | A47J 31/4485 99/453 |
| 2013/0019903 A1 | * | 1/2013 | Rizzuto | A47J 31/46 134/22.15 |
| 2013/0040028 A1 | * | 2/2013 | Doppe | A47J 31/4485 426/474 |
| 2015/0024103 A1 | * | 1/2015 | Bronnimann | A47J 31/4485 426/474 |
| 2015/0182062 A1 | * | 7/2015 | Rizzuto | A47J 31/46 99/323.1 |
| 2015/0182066 A1 | * | 7/2015 | Rizzuto | A47J 31/46 99/290 |
| 2016/0051083 A1 | * | 2/2016 | Turi | A47J 31/469 426/474 |
| 2017/0340161 A1 | * | 11/2017 | Andreis | A47J 31/4489 |
| 2019/0142211 A1 | * | 5/2019 | Majer | A47J 31/4485 426/231 |
| 2019/0274472 A1 | * | 9/2019 | Epping | A47J 31/60 |

\* cited by examiner

MILK FOAM GENERATOR OF COFFEE MAKER

CROSS-REFERENCE TO RELATED APPLICATIONS

The present application claims priority from Chinese patent Application No. 2017211352304, filed on Sep. 6, 2017, the entire contents of which are incorporated herein by reference.

TECHNICAL FIELD

The utility model relates to the field of coffee maker technologies, and more particularly, to a milk foam generator of a coffee maker.

BACKGROUND ART

Fancy coffee is usually made through adding milk foams in coffee liquid. According to a steam foaming nozzle device of a coffee maker with application No. 201020575326.4 disclosed on Aug. 10, 2011, rotating to adjust a sleeve can change the indrawn air volume, so as to adjust the fine degree of the milk foams. Moreover, the foaming nozzle is only adaptive to the occasion of making milk foams by steam, and the application scope is relatively narrow.

SUMMARY OF UTILITY MODEL

The object of the utility model is aimed at providing a milk foam generator of a coffee maker that can adjust the emulsification effect of the milk through adjusting the inlet of the air.

In order to achieve the object above, the technical solution provided by the utility model is a milk foam generator of a coffee maker, which comprises a milk tank, wherein a top part of the milk tank is provided with a support, a foam generator body is placed on the support, the foam generator body is respectively connected to an inlet milk pipe, a steam pipe and a milk foam sprayer, the foam generator body is internally provided with a first emulsification chamber, the first emulsification chamber is communicated with an air inlet channel, and the air inlet channel is internally provided with an air inlet adjustment member.

The air inlet adjustment member comprises an adjustment sleeve and a pulling rod, an outer wall of an adjustment end of the pulling rod is concavely provided with a gradually changed groove, the adjustment end slides in a pipe chamber of the adjustment sleeve, so that a size of an inlet of the air inlet channel communicated with an outside is changed.

The adjustment sleeve is made of a silica gel material.

The foam generator body further comprises a steam pipe chamber, a milk indrawing chamber, an air inlet pipe and a mixing outlet chamber, an end part of the air inlet pipe is provided with an adjustment sleeve chamber, and the adjustment sleeve is arranged in the adjustment sleeve chamber; the steam pipe chamber is internally provided with a steam pipe port, and the steam pipe is connected to the foam generator body through the steam pipe port.

An end part of the steam pipe port is tapered to form a tapered air jet hole, and the air jet hole stretches into the first emulsification chamber.

One end of the first emulsification chamber is tapered.

The milk foam sprayer comprises a milk foam spray pipe and a direction rotary knob, one end of the milk foam sprayer is inserted in the mixing outlet chamber and the other end is fixed on the direction rotary knob, and a seal ring is arranged between the milk foam spray pipe and the foam generator body.

A necking hole is arranged between the first emulsification chamber of the foam generator body and the mixing outlet chamber, the milk foam spray pipe is internally provided with a second emulsification chamber and a milk foam chamber, and the second emulsification chamber is close to the necking hole.

The second emuisification chamber and the milk foam chamber are set in an L shape.

The steam pipe port is in detachable thread connection with the steam pipe chamber in a sealing manner.

The utility model has the beneficial effect that: the utility model only needs to pull a pulling rod to enable a gradually changed groove of one end of the pulling rod to contact with the adjustment sleeve at the groove with different width, so as to adjust the inlet of the air, so that the fine degree of the milk foam required is adjusted, and the utility model has a simple structure, and is convenient for adjusting the emulsification effect of the milk foams.

The milk foam spray pipe is provided with a direction rotary knob, so that the milk foam made by the coffee maker can be sprayed out from a certain angle range, which is very convenient for use.

DETAILED DESCRIPTION OF THE PREFERRED EMBODIMENTS

The following embodiments describe the utility model in detail.

Figure 1:
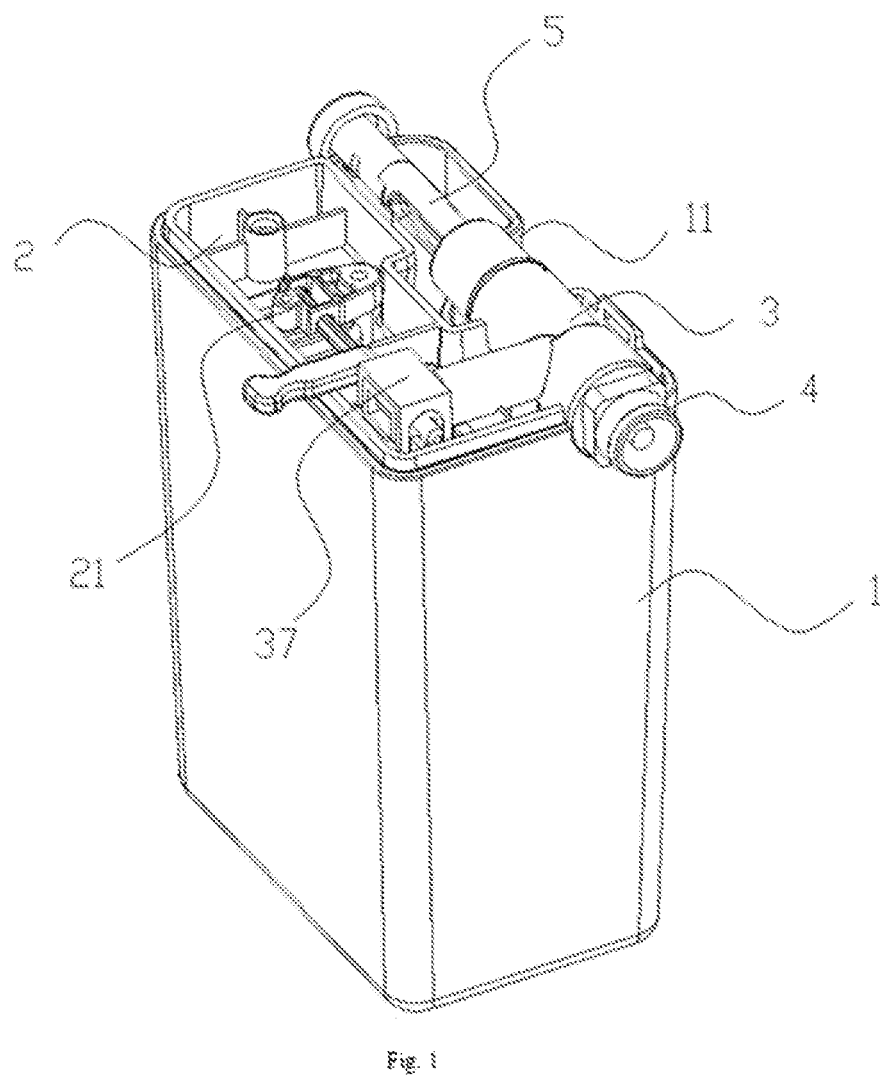
FIG. 1 is a schematic diagram of a structure of a milk tank structure of a coffee maker according to the utility model.
Figure 2:
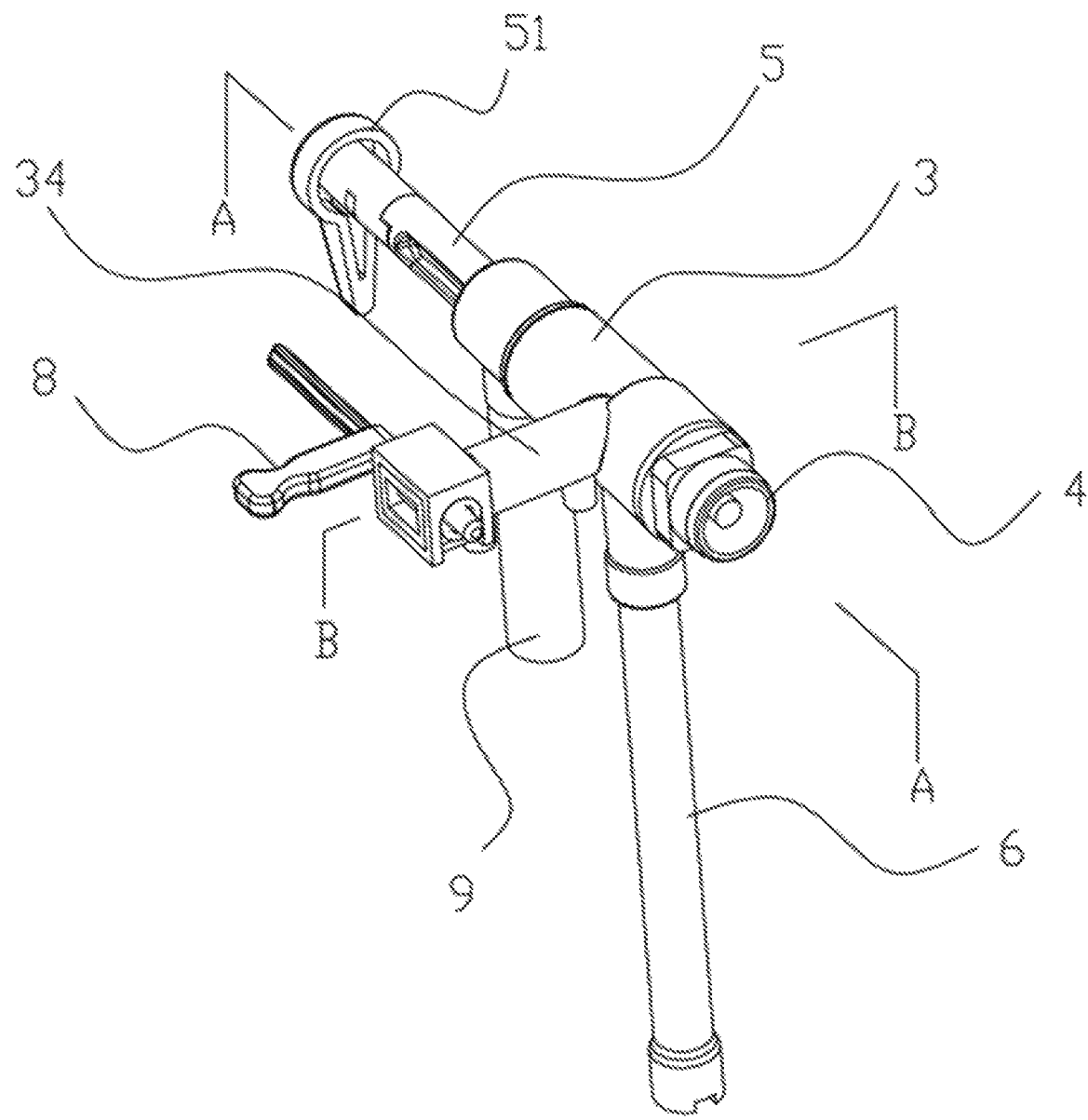
FIG. 2 is a schematic diagram of a structure of a milk foam generator of the coffee maker according to the utility model.
Figure 3:
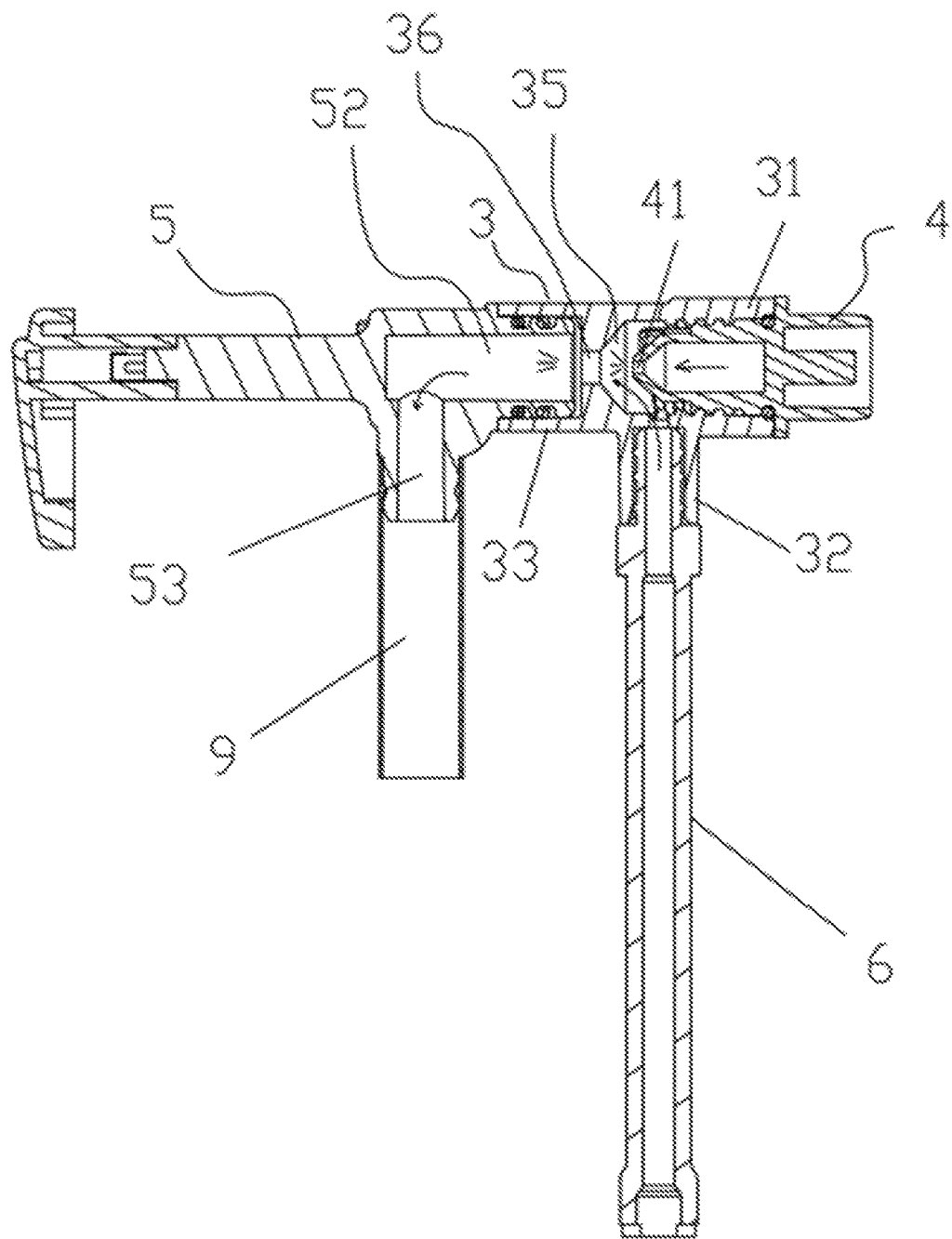
FIG. 3 is an A-A cross-section diagram of the milk foam generator body according to the utility model.
Figure 4:
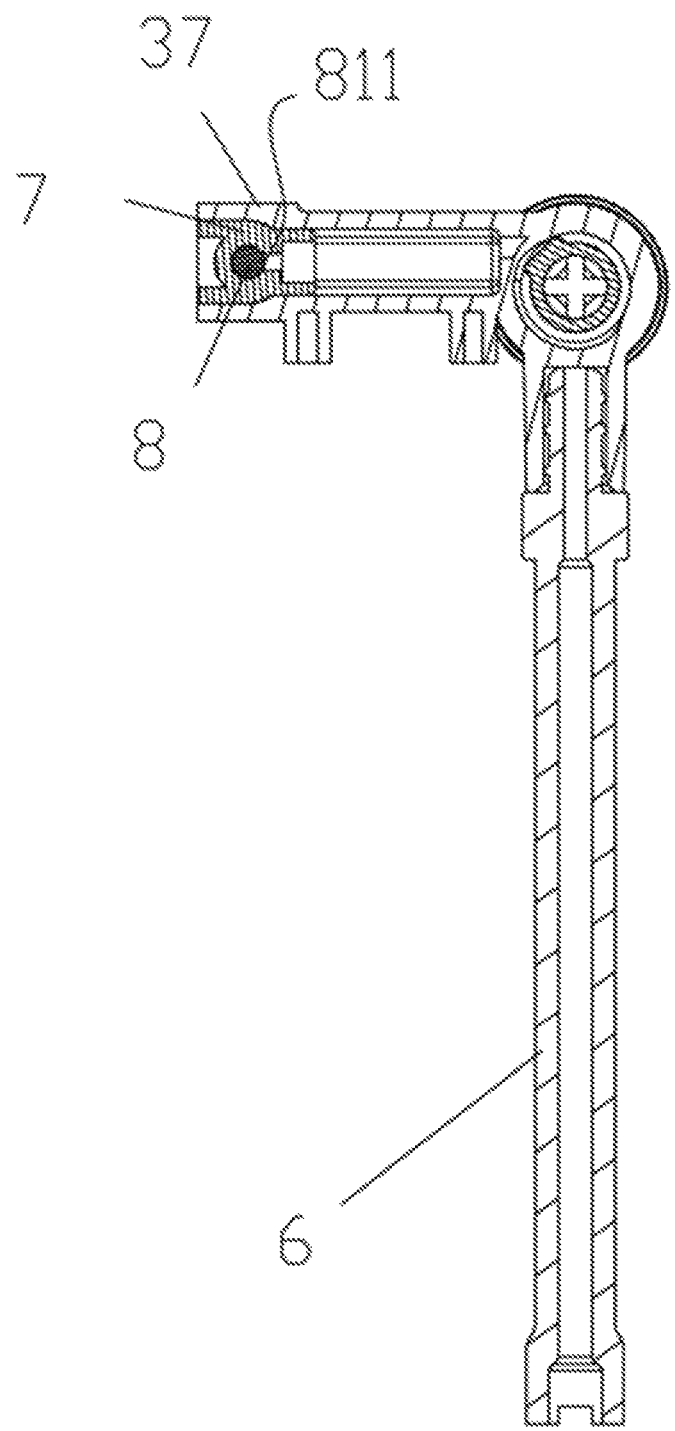
FIG. 4 is a B-B cross-section diagram of the milk foam generator body according to the utility model.
Figure 5:
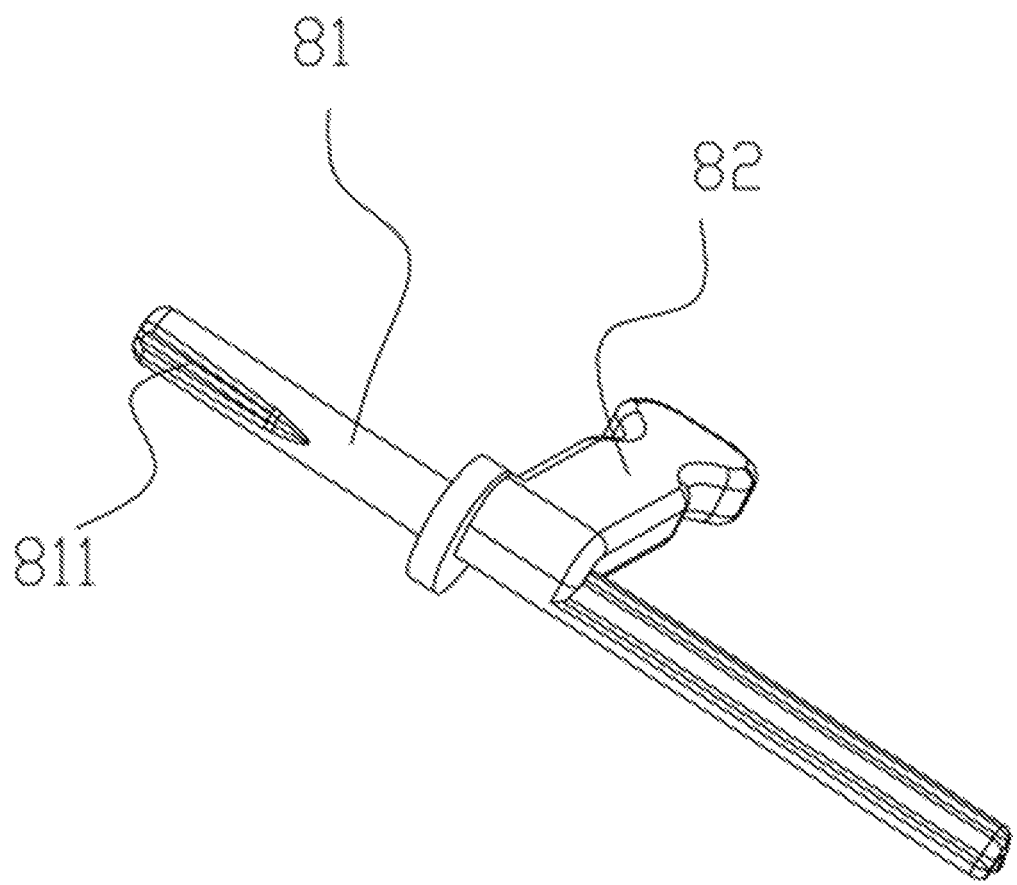
FIG. 5 is a schematic diagram of a structure of a pulling rod according to the utility model.

With reference to FIGS. 1 to 5, a milk foam generator of a coffee maker of the utility model comprises a milk tank 1, wherein a top part of the milk tank is provided with a support 2, a foam generator body 3 is placed on the support, the foam generator body is respectively connected to an inlet milk pipe 6, a steam pipe (not shown in drawings) and a milk foam sprayer, the foam generator body is internally provided with a first emulsification chamber 35, the first emulsification chamber is communicated with an air inlet channel, and the air inlet channel is internally provided with an air inlet adjustment member. One side wall part of the milk tank 1 internally sinks to form a holding space 11 of the milk foam pipe. The support 2 is installed on an upper edge of the milk tank, the support 2 is internally provided with a space suitable for placing the foam generator body and the air inlet adjustment member, such as arranging a guide device 21 of the air inlet adjustment member on the support.

The air inlet adjustment member comprises an adjustment sleeve 7 and a pulling rod 8, an outer wall of an adjustment end 81 of the pulling rod is concavely provided with a gradually changed groove 811, the adjustment end slides in a pipe chamber of the adjustment sleeve, so that a size of an inlet of the air inlet channel communicated with an outside is changed. The pulling rod 8 is composed of the adjustment end 81 and a handle 82.

The adjustment sleeve is made of a silica gel material.

The foam generator body further comprises a steam pipe chamber 31, a milk indrawing chamber 32, an air inlet pipe 34 and a mixing outlet chamber 33, an end part of the air inlet pipe is provided with an adjustment sleeve chamber 37, and the adjustment sleeve 7 is arranged in the adjustment sleeve chamber; the steam pipe chamber s internally provided with a steam pipe port 4, and the steam pipe is connected to the foam generator body through the steam pipe port 4.

An end part of the steam pipe port is tapered to form a tapered air jet hole 41, and the air jet hole stretches into the first emulsification chamber. The steam pipe port is in detachable thread connection with the steam pipe chamber in a sealing manner, which specifically is that: an outer wall of one end of the steam pipe port is provided with an external thread, an inner wall of the steam pipe chamber is provided with an internal thread, the steam pipe port and the steam pipe chamber are adaptively connected, and a seal ring is arranged between the steam pipe port and the steam pipe chamber so that the steam pipe port and the steam pipe chamber are sealingly connected. The steam pipe port can be dismantled from the steam pipe chamber, so that the cleaning operation of the milk tank is easier.

One end of the first emulsification chamber 35 is tapered.

The milk foam sprayer comprises a milk foam spray pipe 5 and a direction rotary knob 51, one end of the milk foam sprayer is inserted in the mixing outlet chamber and the other end is fixed on the direction rotary knob, and a seal ring is arranged between the milk foam spray pipe and the foam generator body.

A necking hole 36 is arranged between the first emulsification chamber of the foam generator body and the mixing outlet chamber, the milk foam spray pipe is internally provided with a second emulsification chamber 52 and a milk foam chamber 53, and the second emulsification chamber is close to the necking hole.

The second emulsification chamber and the milk foam chamber are set in an L shape. The milk foam sprayer is connected to a milk foam pipe 9.

The operating principle of the air inlet adjustment of the utility model is that: since the adjustment end of the pulling rod is sealingly coordinated with the adjustment sleeve, the outside air enters the adjustment sleeve and enters the air inlet channel through the adjustment sleeve, which enters from a gap formed by the gradually changed groove and the adjustment sleeve, regarding to the gradually changed groove arranged in a concave manner, when the gradually changed groove slides to different positions in the pipe chamber of the adjustment sleeve, the gap formed by the gradually changed groove and the adjustment sleeve is different, and the gap is gradually changed with a displacement change of the pulling road. Therefore, when the pulling rod is pulled to an end of the gradually changed groove, the air inlet when the coordination is conducted more, and when the pulling rod is pulled to a tail part of the gradually changed groove, the gap coordinated by the gradually changed groove with the adjustment sleeve is smaller and smaller. Therefore, the air inlet is less. A user pulls the pulling rod manually, so as to adjust a fine degree of the milk foam required.

The invention claimed is:

1. A milk foam generator of a coffee maker, comprising a milk tank, wherein a top part of the milk tank is provided with a support, a foam, generator body is placed on the support, the foam generator body is respectively connected to an inlet milk pipe, a steam pipe and a milk foam sprayer, the foam generator body is internally provided with a first emulsification chamber, the first emulsification chamber is communicated with an air inlet channel, and the air inlet channel is internally provided with an air inlet adjustment member;

wherein the air inlet adjustment member comprises an adjustment sleeve and a pulling rod, an outer wall of an adjustment end of the pulling rod is concavely provided with a gradually changed groove, the adjustment end slides in a pipe chamber of the adjustment sleeve, so that a size of the inlet of the air inlet channel communicated with an outside is changed;

wherein the adjustment sleeve is made of a silica gel material;

wherein the foam generator body further comprises a steam pipe chamber, a milk indrawing chamber, an air inlet pipe and a mixing outlet chamber, an end part of the air inlet pipe is provided with an adjustment sleeve chamber, and the adjustment sleeve is arranged in the adjustment sleeve chamber; the steam pipe chamber is internally provided with a steam pipe port, and the steam pipe is connected to the foam, generator body through the steam pipe port;

wherein the milk foam comprises a milk foam spray pipe and a direction rotary knob, one end of the milk foam sprayer is inserted in the mixing outlet chamber and the other end is fixed on the direction rotary knob, and a seal ring is arranged between the milk foam spray pipe and the foam generator body.

2. The milk foam generator of a coffee maker according to claim 1, wherein a necking hole is arranged between the first emulsification chamber of the foam generator body and the mixing outlet chamber, the milk foam spray pipe is internally provided with a second emulsification chamber and a milk foam chamber, and the second emulsification chamber is close to the necking hole;

wherein an end part of the steam pipe port is tapered to form a tapered air jet hole, and the air jet hole stretches into the first emulsification chamber;

wherein one end of the first emulsification chamber is tapered.

3. The milk foam generator of a coffee maker according to claim 2, wherein the second emulsification chamber and the milk foam chamber are set in an L shape.

4. The milk foam generator of a coffee maker according to claim 1, wherein the steam pipe port is in detachable thread connection with the steam pipe chamber in a sealing manner.

* * * * *